US 12,070,852 B2

(12) United States Patent
Iwasaki (10) Patent No.: US 12,070,852 B2
(45) Date of Patent: Aug. 27, 2024

(54) END EFFECTOR AND ROBOT HAVING THE SAME (71) Applicant: Kawasaki Jukogyo Kabushiki Kaisha, Kobe (JP)

(72) Inventor: Yukio Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 425 days.

(21) Appl. No.: 17/416,555

(22) PCT Filed: Dec. 18, 2019

(86) PCT No.: PCT/JP2019/049561
§ 371 (c)(1),
(2) Date: Jun. 21, 2021

(87) PCT Pub. No.: WO2020/130023
PCT Pub. Date: Jun. 25, 2020

(65) Prior Publication Data
US 2022/0080605 A1 Mar. 17, 2022

(30) Foreign Application Priority Data

Dec. 21, 2018 (JP) ................. 2018-239928

(51) Int. Cl.
B25J 15/08 (2006.01)
B25J 9/16 (2006.01)
B67B 3/20 (2006.01)
(52) U.S. Cl.
CPC ............. *B25J 15/08* (2013.01); *B25J 9/1694* (2013.01); *B67B 3/2066* (2013.01)

(58) Field of Classification Search
CPC ........ B25J 15/08; B25J 9/1694; B25J 9/0087; B25J 11/00; B25J 15/0052; B67B 3/2066; B67B 3/20
See application file for complete search history.

(56) References Cited

U.S. PATENT DOCUMENTS

2010/0307110 A1   12/2010   Wilhelm et al.
2011/0030316 A1   2/2011    Blumenstock et al.
(Continued)

FOREIGN PATENT DOCUMENTS

JP    59-74094 A     4/1984
JP    59-142993 A    8/1984
(Continued)

OTHER PUBLICATIONS

International Search Report and Written Opinion mailed on Mar. 17, 2020, received for PCT Application PCT/JP2019/049561, Filed on Dec. 12, 2019, 11 pages including English Translation.

Primary Examiner — Kira Nguyen
(74) Attorney, Agent, or Firm — XSENSUS LLP (57) ABSTRACT An end effector configured to open and close a screw-type lid for closing an opening of a container body, is provided, which includes a container gripper configured to grip the container body, a lid gripper configured to grip the lid and be movable on a screw axis of the lid, a rotating part configured to rotate the lid gripper, a guiding part configured to guide the lid gripper being rotated by the rotating part to move on the screw axis, and a detector configured to detect that the lid gripper is moved to one of an opened position and a closed position of the lid. According to this, the end effector capable of appropriately opening and closing the screw-type lid while gripping the container body can be configured.

20 Claims, 7 Drawing Sheets (56) References Cited

U.S. PATENT DOCUMENTS

| | | | | |
|---|---|---|---|---|
| 2014/0102239 A1* | 4/2014 | Umeno | .............. | G01N 35/0099 |
| | | | | 294/213 |
| 2015/0166208 A1* | 6/2015 | Miyauchi | ........... | G01N 35/0099 |
| | | | | 53/381.1 |
| 2017/0369833 A1* | 12/2017 | Kamiya | ................. | C12M 23/46 |
| 2018/0036820 A1* | 2/2018 | Takazane | ................. | B23K 3/08 |
| 2019/0047155 A1* | 2/2019 | Okuyama | .............. | B25J 13/085 |

FOREIGN PATENT DOCUMENTS

| | | |
|---|---|---|
| JP | H09-272594 A | 10/1997 |
| JP | 2011-504856 A | 2/2011 |
| JP | 2011-518090 A | 6/2011 |
| JP | 2015-112704 A | 6/2015 |
| JP | 2016-64112 A | 4/2016 |
| JP | 2016-124057 A | 7/2016 |

\* cited by examiner

END EFFECTOR AND ROBOT HAVING THE SAME

CROSS-REFERENCE TO RELATED APPLICATIONS

This application is based on PCT filing PCT/JP2019/049561, filed Dec. 18, 2019, which claims priority to and the benefit of Japanese Patent Application No. 2018-239928, filed on Dec. 21, 2018, the entire disclosure of each are incorporated herein by reference.

TECHNICAL FIELD

The present disclosure relates to an end effector which opens and closes a screw-type lid (cap) of a container, and a robot having the end effector.

BACKGROUND ART

Conventionally, robots may be used to open and close a lid of a container. The container includes various containers related to, for example, food (e.g., a drink container), beauty (e.g., a cosmetic container), and painting (e.g., a paint container), which are made of resin, glass, metal, etc. Some of the containers use a screw-type lid (screw top lid).

For example, one conventional technology of a robotic system which opens the lid of such a container, discloses to grip a conical tube (container) and its cap by separate hands, and rotate the cap by one of the hands to open it (e.g., Patent Document 1).

Moreover, another conventional technology discloses to respectively grip a hard part and a stopper of a container by pairs of gripping claws, and relatively twist the hard part and the stopper so as to detach the stopper (e.g., Patent Document 2).

PRIOR ART DOCUMENTS

Patent Documents

[Patent Document 1] JP2015-112704A
[Patent Document 2] JP2016-064112A

DESCRIPTION OF THE DISCLOSURE

Problems to be Solved by the Disclosure

However, in both of the conventional technologies described above, since the separate hands grip the container body and the lid, respectively, and the hand(s) is rotated in an opening direction of the lid, the hands are required to be controlled separately, which increases an operating time. Moreover, the control of the plurality of hands requires cost and time. In addition to this, since the opening state of the lid is determined based on a rotational angle of the hand, the lid may not be actually opened when a slip occurs between the lid and the hand.

Therefore, one purpose of the present disclosure is to provide an end effector and a robot having the end effector, capable of appropriately opening and closing a screw-type lid while gripping a container body.

SUMMARY OF THE DISCLOSURE

In order to achieve the purpose, an end effector according to the present disclosure is configured to open and close a screw-type lid for closing an opening of a container body and includes a container gripper configured to grip the container body, a lid gripper configured to grip the lid and be movable on a screw axis of the lid, a rotating part configured to rotate the lid gripper, a guiding part configured to guide the lid gripper being rotated by the rotating part to move on the screw axis, and a detector configured to detect that the lid gripper is moved to one of an opened position and a closed position of the lid. The "end effector" as used herein and in appended claims may include a wrist part of a robotic arm. Moreover, the rotation of the rotating part includes a "forward rotation" and a "reverse rotation."

According to this configuration, while the container body is held by a container holder provided to the end effector, by gripping the lid by the lid gripper provided to the end effector and rotating the lid gripper by the rotating part, the lid can be moved on the screw axis to be opened and closed. Thus, by the single end effector, the screw-type lid which closes the opening of the container can be appropriately opened and closed.

Moreover, the guiding part may include a guide configured to inhibit the lid gripper to rotate relative to the rotating part, and allow the lid gripper to move on the screw axis relative to the rotating part.

According to this configuration, the lid gripper can be smoothly moved on the screw axis along the guide while being rotated together with the rotating part.

Moreover, the container gripper may include a container chuck configured to grip the container body from sides. The lid gripper may include a lid chuck configured to grip the lid from above.

According to this configuration, the container chuck can grip the container body placed on a table etc. from sides, and in this state, the lid chuck can grip the lid from above to appropriately open and close the lid.

In another aspect, a robot according to the present disclosure includes any one of the end effectors described above.

According to this configuration, while the container body is held by the container holder, the end effector provided to the robot grips the lid by the lid gripper provided to the end effector and rotates the lid gripper by the rotating part, and thereby, the lid can be moved on the screw axis to be opened and closed.

Moreover, the robot may open and close the lid by the lid gripper of the end effector, while gripping and moving the container body by the container gripper of the end effector.

According to this configuration, the container gripper of the end effector grips and moves the container body, and at the same time, the lid gripper can grip the lid to open and close. Thus, when the work includes moving the container, time required for a series of works can be shortened.

Moreover, the robot may include a robotic arm, and a controller configured to control operation of the robotic arm. The robotic arm may include a link, and a wrist part rotatably provided to a tip of the link. The container gripper may be attached to the link. The rotating part may be included in the wrist part. The controller may stop the rotation of the rotating part when the detector detects that the lid gripper is moved to the opened position or the closed position of the lid.

According to this configuration, the end effector can be disposed at the suitable position for the container by the robotic arm having the link and the wrist part, the container gripper provided to the end effector can grip the container, and the lid can be gripped by the lid gripper to be appropriately opened and closed.

Moreover, the container gripper may be servo-controlled by an external axis control of the controller.

According to this configuration, container bodies made of materials different in their hardness, such as resin, glass, and metal, can be gripped by the container gripper being appropriately servo-controlled by the external axis control, and thus, this operation can be controlled in cooperation with the operation of gripping and opening and closing of the lid by the lid gripper.

Moreover, the robotic arm may have at least two robotic arms, and the end effector may be provided to at least one of the two robotic arms.

According to this configuration, the end effector provided to at least one of the two robotic arms can grip the container body by the container gripper, and grip the lid by the lid gripper to open and close, and the other robotic arm can perform work in parallel with this. Thus, different works by two robotic arms can be performed simultaneously.

Moreover, the robot may be an articulated robot.

According to this configuration, the articulated robot can easily perform the operation of moving the container body and the lid three-dimensionally to dispose them at suitable positions.

Moreover, the robot may be a dual-arm robot.

According to this configuration, the single dual-arm robot can easily perform the open and close work of the lid of the container by the end effector provided to one of the arms, and another work by the other robotic arm simultaneously.

Effect of the Disclosure

According to the present disclosure, the single end effector can grip and appropriately open and close the screw-type lid while gripping the container body.

BRIEF DESCRIPTION OF DRAWINGS

FIGS. 2(A) and 2(B) are views illustrating an operation example of the end effector illustrated in FIG. 1, where

MODE FOR CARRYING OUT THE DISCLOSURE

Hereinafter, one embodiment of the present disclosure is described with reference to the accompanying drawings. This embodiment exemplarily describes an end effector 20 provided to a robotic arm 10 of a robot 1 illustrated in FIG. 6. As one example of operation of the end effector 20, opening operation of an upright container 60 from above is described. Note that a concept of an "up-and-down direction" and a "left-and-right direction" as used herein and in appended claims coincides with a concept of an "up-and-down direction" and a "left-and-right direction" indicated in FIG. 1.

(Configuration of End Effector)

Figure 1:
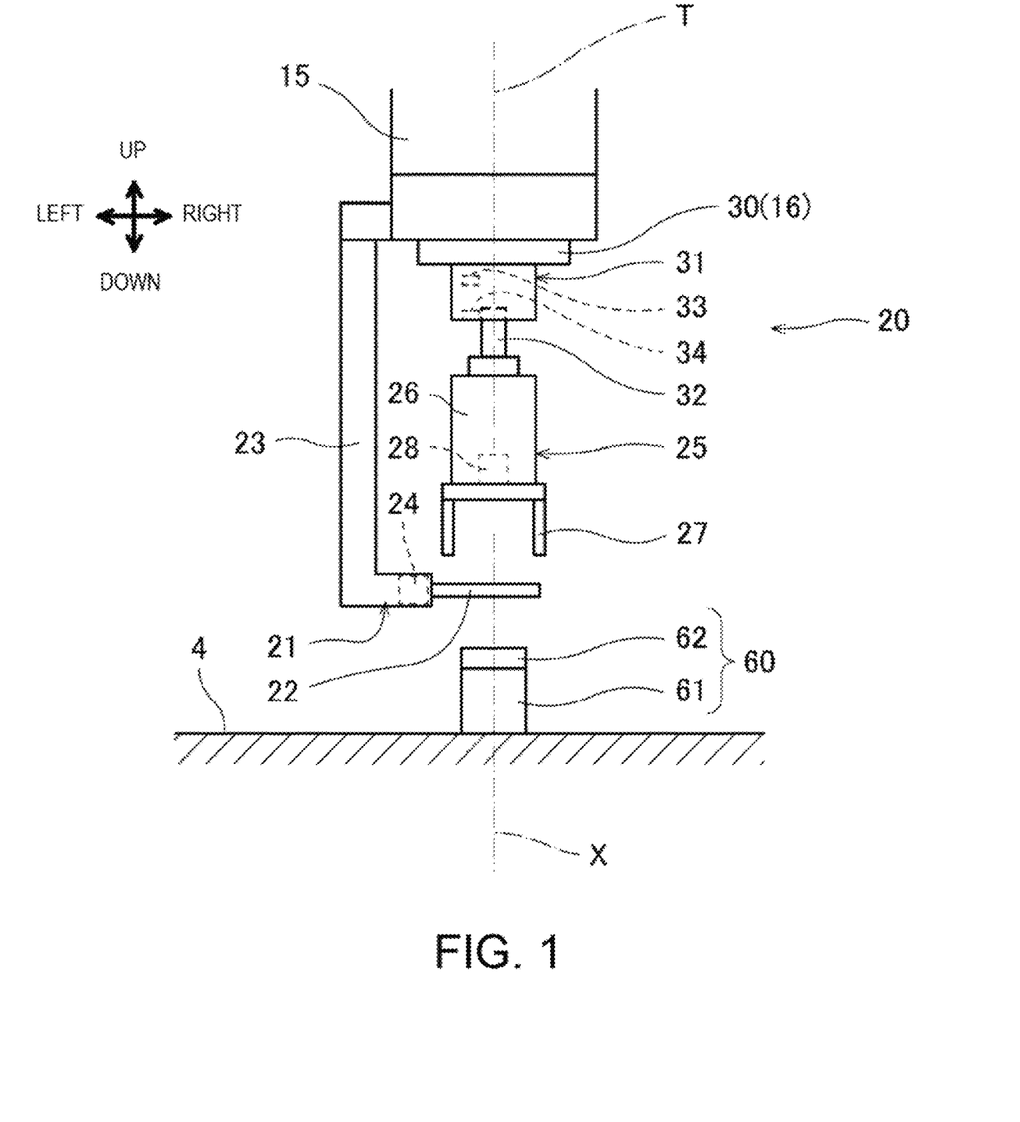
FIG. 1 is a front view illustrating an end effector according to one embodiment of the present disclosure.
Figure 6:
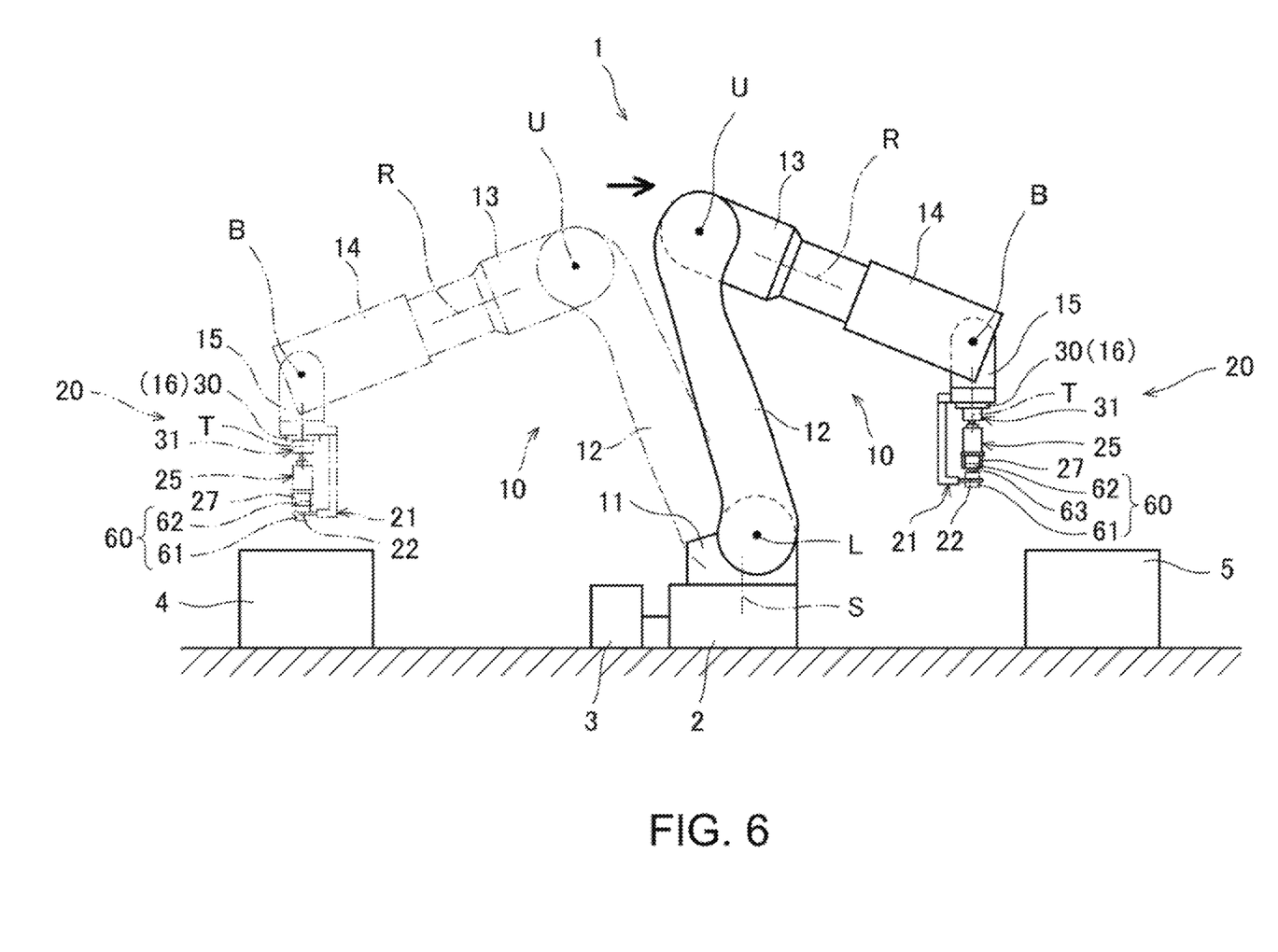
FIG. 6 is a front view illustrating an operation example of a robot having the end effector illustrated in FIG. 1.

FIG. 1 is a front view illustrating the end effector 20 according to this embodiment. The end effector 20 is provided to a tip part of the robotic arm 10 (FIG. 6). In this embodiment, a rotating part 30 of the end effector 20 is included in a wrist part 16 of the robotic arm 10, and the wrist part 16 which is the rotating part 30 is included in the end effector 20. The rotating part 30 (the wrist part 16) is rotatable centering on a wrist rotational axis T. The end effector 20 is provided with a container gripper 21 which grips a container body 61, a lid gripper 25 which is provided on a screw axis X of a lid 62 to be screwed onto the container body 61, and grips the lid 62, and the rotating part 30 which rotates the lid gripper 25. The screw axis X is coaxial with the wrist rotational axis T. Therefore, by the rotating part 30 being rotated in a clockwise or a counterclockwise direction centering on the wrist rotational axis T, the lid 62 can be rotated by the lid gripper 25 in a direction to be screwed onto a screw portion 63 (FIG. 3) of the container body 61, or a direction to be loosen (to be detached).

The rotating part 30 is provided with a guiding part 31 for the lid gripper 25. The guiding part 31 is provided with a guide extending in the up-and-down direction. In this embodiment, a linear guide 32 is provided as the guide, and the lid gripper 25 is provided to a tip of the linear guide 32. Although the linear guide 32 is allowed to be displaced (advanced and retreated) with respect to the guiding part 31 in the up-and-down direction (in the direction of the screw axis), a rotation relative to the guiding part 31 (the rotating part 30) is not allowed. Thus, when the rotating part 30 rotates, the guiding part 31 rotates together with the linear guide 32. The guide may be any guide, as long as it does not rotate relative to the guiding part 31, but rotates together with the guiding part 31 when the rotating part 30 rotates, and is allowed to move on the screw rotational axis X. Then, also the lid gripper 25 provided to the tip of the linear guide 32 rotates integrally. The lid gripper 25 is guided by the linear guide 32 so as to be movable in the up-and-down direction on the screw axis X of the lid 62.

The guiding part 31 is provided with a first limit switch 33 as a detector which detects that the lid gripper 25 is retreated (raised) to one predetermined position on the screw axis X of the lid 62, and a second limit switch 34 as the detector which detects that the lid gripper 25 is advanced (lowered) to another predetermined position on the screw axis X. Each of the limit switches 33 and 34 detects that a detected part (not illustrated) of the linear guide 32 which moves integrally with the lid gripper 25, moves to the predetermined position. These limit switches 33 and 34 detect whether the lid gripper 25 moves to an opened position or a closed position of the lid 62 on the screw axis X. The detector is not limited to the limit switches 33 and 34, but may be other positional sensors. The linear guide 32 may be an air cylinder. When the air cylinder is used, an air cylinder with an automatic switch can be used. In the case of using the air cylinder with the automatic switch, a built-in switch constitutes the detector. Moreover, the detector may detect a rotational speed (including a rotational angle) of the lid gripper 25 (the rotating part 30). For example, when the container 60 is configured such that the lid 62 is removable by three rotations, the detector may detect that the lid gripper 25 (the rotating part 30) is rotated three rounds or more (the number of rotations which does not cause a problem if a slip of the gripper occurs, e.g., four or five rotations). This case of detecting the number of rotations can also be included in detecting that the lid gripper 25 is moved to the opened position of the lid 62, since the lid gripper 25 is moved to the opened position together with the lid 62.

The lid gripper 25 is provided with a lid chuck 27 at a lower end of a lid gripper body 26. The illustrated lid chuck 27 extends downwardly, above the container 60, to the left and right sides of the lid 62, and grips the lid 62 from the left and right sides. The lid chuck 27 acts to grip the lid 62 from the left and right sides by a drive 28 (e.g., a motor). A driving mechanism of the lid chuck 27 may be a known mechanism which opens and closes the lid chuck 27 in a facing state. Moreover, the lid chuck 27 may be, for example, a V-shaped chuck which horizontally grips the lid 62 from the left and right sides, or a chuck which grips at a plurality of places (e.g., three places) from above. The state in which the lid gripper 25 is hung down from the guiding part 31 is illustrated in the drawings.

The container gripper 21 includes a container gripper body 23 in a substantially L-shape extending downwardly from a tip part of the robotic arm 10 (a fifth link 15 described later), and is provided with a container chuck 22 extending laterally from a lower-end part of the container gripper body 23. The container gripper 21 is provided to a part of the robotic arm 10 nonrotatable about the wrist rotational axis T. The container chuck 22 acts to sandwich the container body 61 from both sides by a drive 24 (e.g., a motor) provided to the container gripper 21. The drive of the container chuck 22 may be any known mechanism which opens and closes the container chuck 22 in a facing state. When the container chuck 22 is expanded in an opening direction (a direction orthogonal to the drawing sheets), the container chuck 22 can be downwardly lowered without being contacted to the container body 61. Gripping surfaces (inner surfaces) of the container chuck 22 are formed, for example, in a shape conforming to an outer surface of the container body 61. For example, when an external shape of the container body 61 is circular, each of the gripping surfaces of the container chuck 22 may be formed to have an arc-shape so as to conform to an outer surface of the container body 61. When the external shape of the container body 61 is rectangular, the gripping surfaces of the container chuck 22 may be formed to extend in parallel to each other along outer surfaces of the container body 61. If the container chuck 22 is servo-controlled through an external axis control of the robot 1, its gripping force etc. can be appropriately controlled according to the container body 61. Accordingly, container bodies 61 made of materials different in their hardness, such as resin, glass, and metal, can be appropriately gripped.

(Operation Example of End Effector)

Figure 2A:
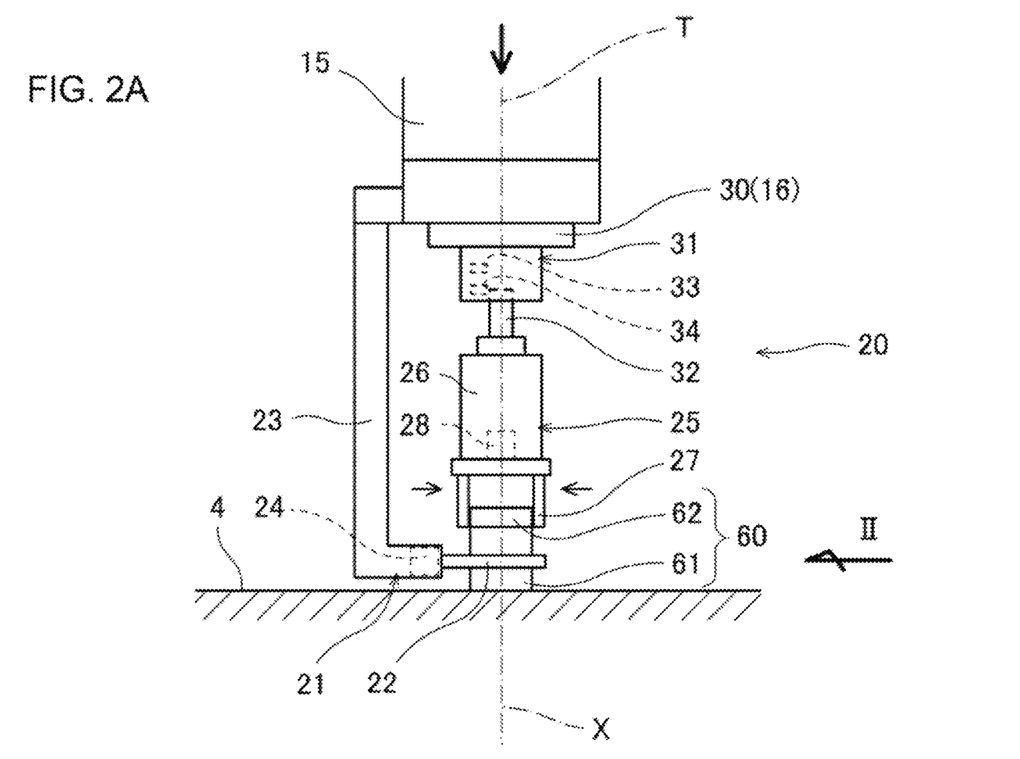
FIG. 2(A) is a front view.
Figure 2B:
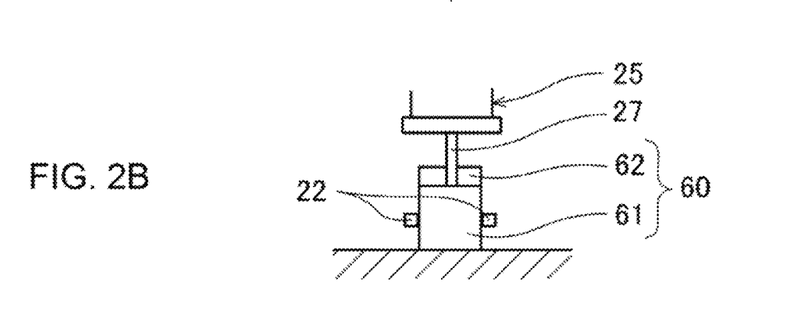
FIG. 2(B) is a view seen in a direction of an arrow II illustrated in FIG. 2(A).
Figure 3:
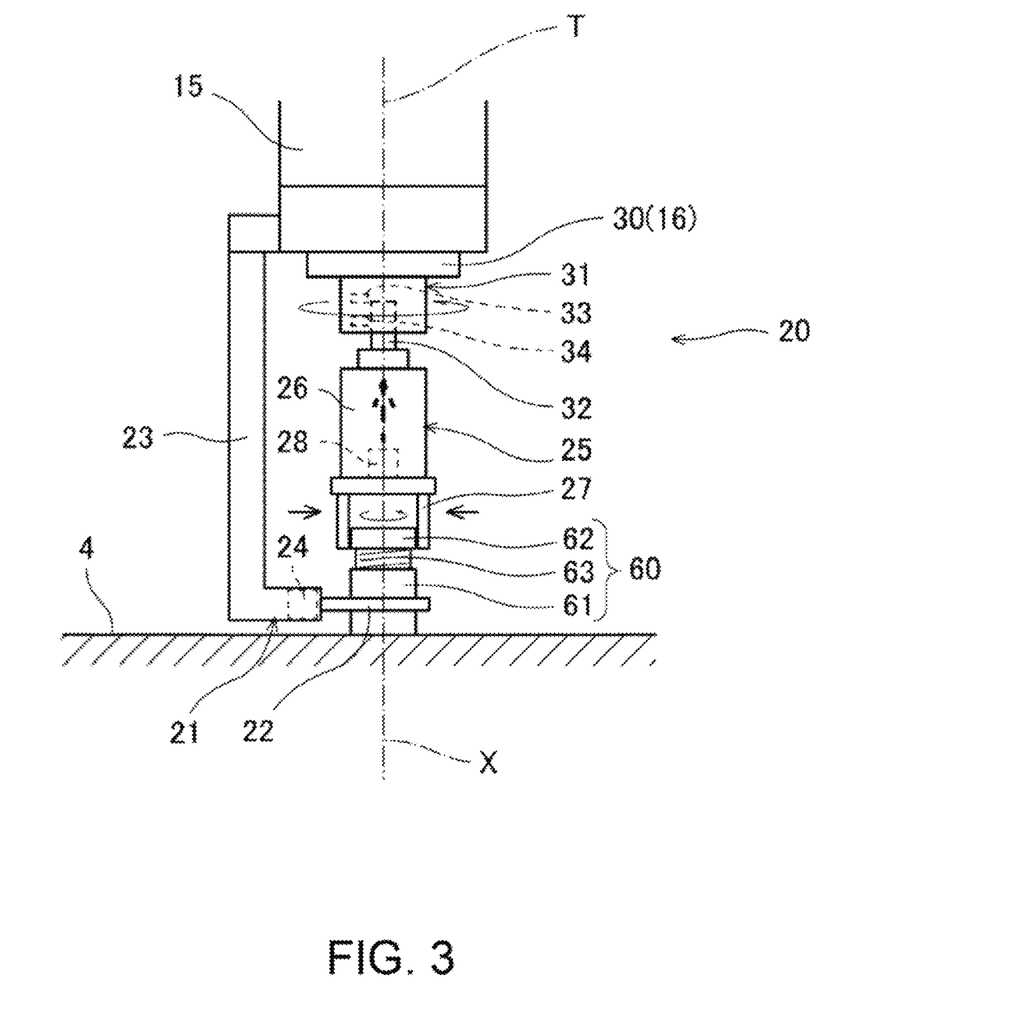
FIG. 3 is a front view illustrating the next state of the end effector illustrated in FIG. 2.
Figure 4:
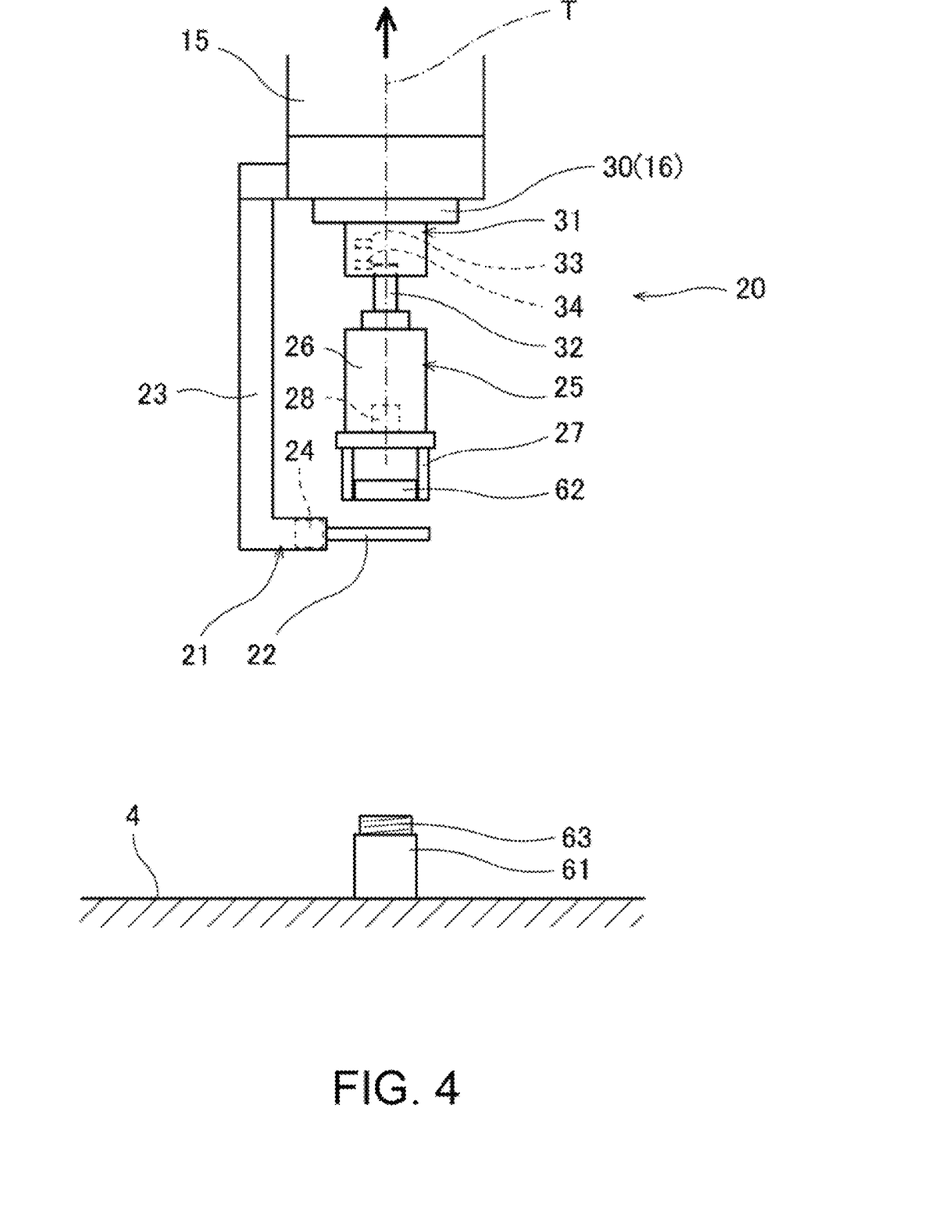
FIG. 4 is a front view illustrating the next state of the end effector illustrated in FIG. 3.

FIGS. 2(A) and 2(B) are views illustrating an operation example of the end effector 20 illustrated in FIG. 1, where FIG. 2(A) is a front view, and FIG. 2(B) is a view seen in a direction of an arrow II illustrated in FIG. 2(A). FIG. 3 is a front view illustrating the next state of the end effector 20 illustrated in FIG. 2. FIG. 4 is a front view illustrating the next state of the end effector 20 illustrated in FIG. 3. With reference to these drawings, an operation example is described, in which the screw-type lid 62 closing an opening formed in an upper-end part of the container 60, is removed to open the container 60.

As illustrated in FIGS. 2(A) and 2(B), the container chuck 22 of the end effector 20 is positioned on both sides of the container 60 placed on a table 4, and the lid chuck 27 is positioned so as to be grippable of the lid 62. Then, the container chuck 22 grips the container body 61, and the lid chuck 27 grips the lid 62.

Then, as illustrated in FIG. 3, the rotating part 30 rotates the lid gripper 25 in the opening direction of the lid 62, and thus, the lid chuck 27 and the lid 62 rotate integrally. The screw-type lid 62 is moved upwardly along the screw portion 63 of the container body 61 by being rotated in the opening direction. Upon this movement, the linear guide 32 provided between the lid gripper 25 and the rotating part 30 moves upwardly, which allows the displacement of the lid gripper 25. The linear guide 32 is detected by the first limit switch 33 when it moves to the one predetermined position at which the lid 62 is detached, and accordingly, the rotation of the rotating part 30 is stopped. Here, the lid 62 is detached from the container body 61. Since the detachment of the lid 62 from the container body 61 is detected based on the moved position of the lid gripper 25 on the screw axis X, whether the lid 62 is detached can be detected appropriately even when a slip occurs between the lid 62 and the lid chuck 27.

Then, as illustrated in FIG. 4, the container chuck 22 gripping the container body 61 is opened to release the gripping of the container body 61. The lid 62 detached from the container body 61 can be transferred to a predetermined place by the end effector 20 while being gripped by the lid chuck 27.

Although this example describes the opening operation in which the end effector 20 detaches the lid 62 from the container body 61, a closing operation is also possible through an inverse operation, in which the container body 61 is closed by the lid 62. Upon the closing by the lid 62, the rotating part 30 rotates the lid gripper 25 in the opposite direction so as to screw the lid 62 onto the screw portion 63 of the container body 61, and thus, the lid gripper 25 and the linear guide 32 of the guiding part 31 are moved downwardly. Then, when the second limit switch 34 detects that the linear guide 32 is moved to a position at which the closing by the lid 62 is appropriately achieved, the rotation of the rotating part 30 is stopped. In this manner, the operation inverse of the opening operation can close the container body 61 by the lid 62.

(Another Operation Example)

Figure 5:
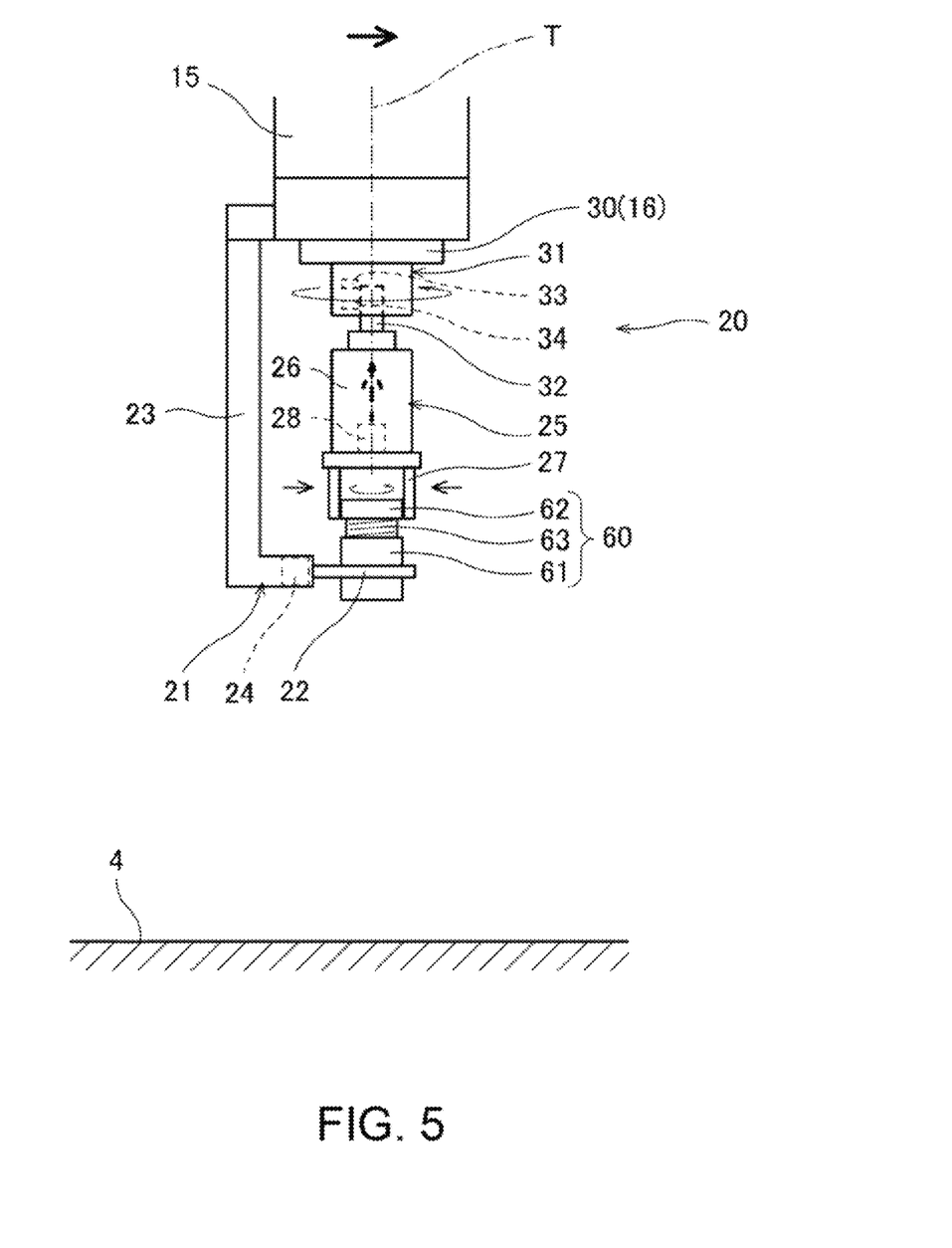
FIG. 5 is a front view illustrating another operation example of the end effector illustrated in FIG. 3.

FIG. 5 is a front view illustrating another operation example of the end effector 20 illustrated in FIG. 3. In this operation example, the lid 62 is detached by the lid gripper 25 in the air, while the container body 61 of the container 60 is gripped and moved by the container gripper 21.

According to this end effector 20, the container 60 is moved while the container chuck 22 of the container gripper 21 grips the container body 61, and the lid chuck 27 of the lid gripper 25 grips the lid 62. Then, the rotating part 30 rotates the lid gripper 25 while the container 60 is moved, and thus, the lid 62 is rotated to be detached from the container body 61. According to this, for example, when repeating a work of detaching the lid 62 from the container 60 closed by the lid 62, and placing the container body 61 at a predetermined place, the lid 62 can be detached in the air while the container 60 is moved by the end effector 20. Therefore, a cycle time of the work can be shortened. Note that the lid 62 may be detached while the container 60 is placed on the table, and then, the container body 61 and the lid 62 may be moved while being gripped.

(Operation Example of Robot Having End Effector)

Figure 7:
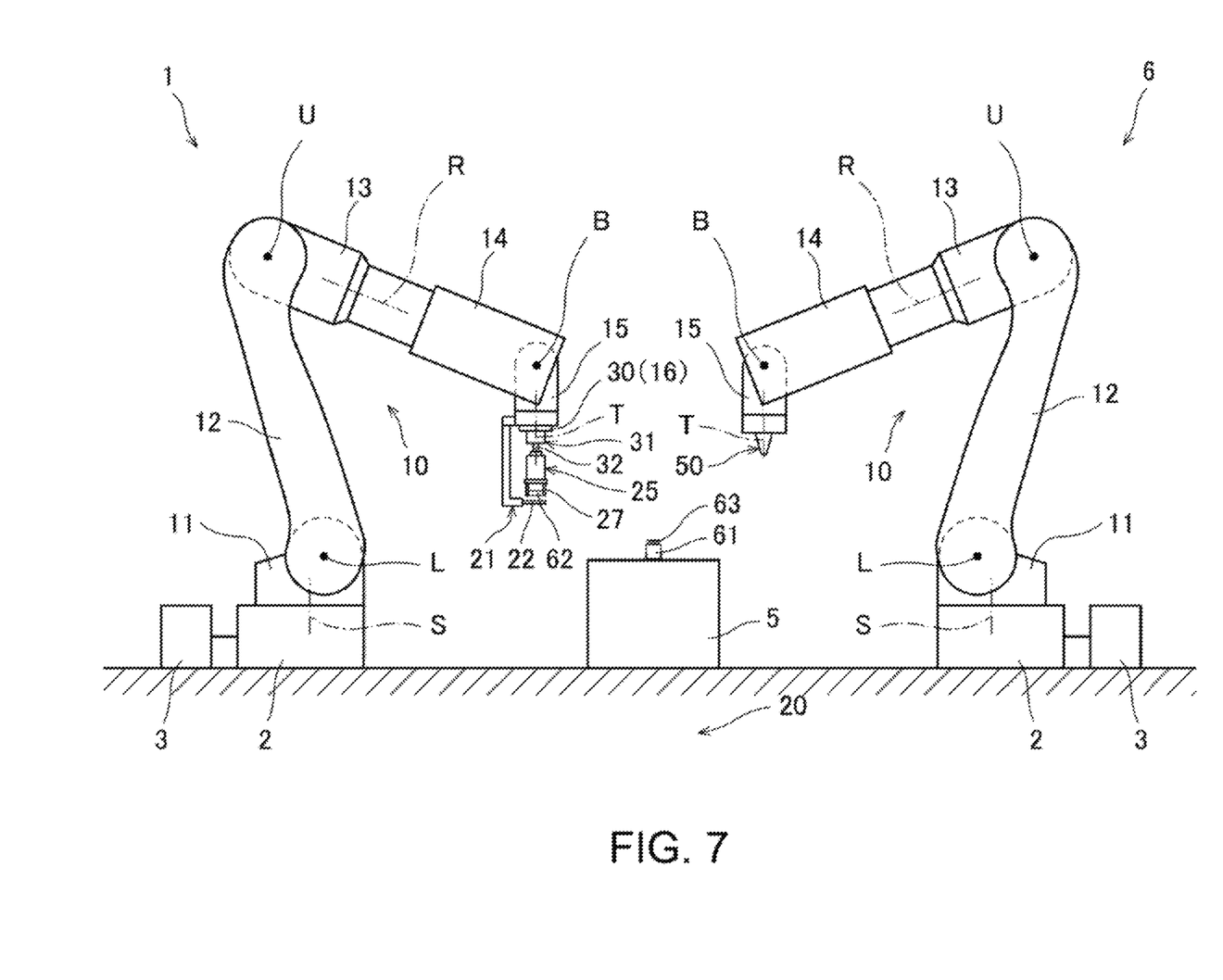
FIG. 7 is a front view illustrating an example of a cooperative work between the robot illustrated in FIG. 6 and another robot.

FIG. 6 is a front view illustrating an operation example of the robot 1 having the end effector 20 illustrated in FIG. 1. FIG. 7 is a front view illustrating an example of a cooperative work between the robot 1 illustrated in FIG. 6 (hereinafter, referred to as a "first robot 1") and another robot 6 (hereinafter, referred to as a "second robot 6").

The robot 1 illustrated in FIG. 6 is an example in which the robot 1 is a 6-axis vertically articulated robot. However, the first robot 1 is not limited to this embodiment. The first robot 1 may be any industrial robot corresponding to its use. Alternative to the vertically articulated robot, the first robot 1 may be a horizontally articulated robot. Alternatively, a single robot can perform different works by using a coaxial dual-arm robot.

In the first robot 1, the robotic arm 10 is provided to a pedestal 2. The robotic arm 10 includes a first link 11 turnably coupled to the pedestal 2 via a turning axis S, a second link 12 swingably coupled to the first link 11 via a lower-arm swinging axis L, a third link 13 swingably coupled to the second link 12 via an upper-arm swinging axis U, a fourth link 14 turnably coupled to the third link 13 via a wrist turning axis R, and the fifth link 15 swingably coupled to the fourth link 14 via a wrist swinging axis B. The wrist part 16 is rotatably coupled to the fifth link 15 via the wrist rotational axis T. As described above, the rotating part 30 is included in the wrist part 16. Note that the first robot 1 is provided with servomotors as actuators, rotational angle detectors, etc. (none of them are illustrated) for the respective axes. Since a vertically articulated robot of a known configuration can be used as the first robot 1, more detailed description of the first robot 1 is omitted.

The end effector 20 is provided to the tip part of the robotic arm 10 of the first robot 1. As described above, the end effector 20 is provided with the container gripper 21 which grips the container body 61, and the lid gripper 25 which grips the lid 62 to be screwed onto the container body 61. The container gripper 21 is attached to the fifth link 15. The lid gripper 25 is provided to the tip of the linear guide 32 of the guiding part 31 provided to the rotating part 30.

A positional control of the end effector 20 by the robotic arm 10, the gripping of the container body 61 by the container gripper 21 of the end effector 20, the gripping of the lid 62 by the lid gripper 25, etc., are controlled by a controller 3. The controller 3 includes a processor, a volatile memory, a non-volatile memory, an I/O interface, etc. The controller 3 controls each part by the processor executing calculation processing using the volatile memory, based on a program stored in the non-volatile memory. The controller 3 detects by the first limit switch 33 (FIG. 1) that the detected part of the linear guide 32 which moves integrally with the lid gripper 25 is raised to the one predetermined position, or detects by the second limit switch 34 (FIG. 1) that the linear guide 32 is lowered to the another predetermined position, and then, stops the rotation of the wrist part 16. The raised position of the lid gripper 25 is set to the opened position where the lid 62 is removed from the container 60, and the rotating part 30 is stopped in the state where the lid 62 is removed from the container 60. The lowered position of the lid gripper 25 is set to the closed position where the lid 62 is screwed onto the container 60 to the another predetermined position. The opened position and the closed position of the lid 62 are set according to the container 60.

Then, in the example illustrated in FIG. 6, the lid gripper 25 of the end effector 20 detaches the lid 62, while the container gripper 21 of the end effector 20 grips and lifts the container body 61 of the container 60, which was placed at a predetermined place on the first table 4, and moves it onto a second table 5 different from the first table 4 (while moving from left to right in the drawing). That is, according to the first robot 1, the container chuck 22 of the container gripper 21 provided to the end effector 20 grips the container body 61, and the lid gripper 25 grips the lid 62 and lifts it from the first table 4 (the state illustrated in a two-dot chain line). Then, the lid gripper 25 is rotated by the rotating part 30 while the end effector 20 is moved by the robotic arm 10. Accordingly, the lid 62 is raised along the screw portion 63, and the linear guide 32 which moves integrally with the lid gripper 25 is detected by the first limit switch 33, and thus, the rotating part 30 is stopped. Here, the lid 62 is detached from the container body 61 (the state illustrated in a solid line). The gripping and moving of the container 60, and the detaching of the lid 62 by the first robot 1 are controlled by the controller 3.

Therefore, for example, when repeating the work of detaching the lid 62 from the container 60 closed by the lid 62, and placing the container body 61 at a predetermined place, such as on the second table 5, a part of the work can be performed in the air during the moving. Thereby, the cycle time of the work can be shortened.

In the example illustrated in FIG. 7, the container body 61 from which the lid 62 is detached while the container 60 being moved, is placed on the predetermined place on the second table 5, and a predetermined amount of paint (liquid) is poured into the container body 61 by a liquid supplying part 50 provided to a tip part of the robotic arm 10 of the second robot 6 different from the first robot 1. The liquid supplying part 50 may have a known configuration provided with a container having a predetermined amount of paint therein, and an open/close valve which discharges the paint. Note that a predetermined amount of paint (liquid) may be extracted from inside the container body 61 by the liquid supplying part 50. Since the second robot 6 is a 6-axis vertically articulated robot same as the first robot 1, the same reference characters are given to the same structures so as to omit description. However, the second robot 6 is not limited to this embodiment. The second robot 6 may be any industrial robot corresponding to its use.

According to this example, since the second robot 6 can move the liquid supplying part 50 which pours the paint into the container body 61, to a stand-by position, during the detaching operation of the lid 62 while the container 60 is moved by the end effector 20, a series of works can be performed promptly. Particularly, for example, when a plurality of paint are mixed so that paint in a desired color is made, the plurality of paint can be mixed promptly, and thus, the work time can be shortened.

The gripping and moving of the container 60, and the detaching of the lid 62 by the first robot 1 are controlled by the controller 3. Moreover, the moving of the liquid supplying part 50 and the pouring of the paint by the second robot 6 are also controlled by the controller 3.

Moreover, although FIG. 7 illustrates the example including two robots of the first robot 1 and the second robot 6, a single coaxial dual-arm robot may be used, for example. In the case of the dual-arm robot, by one of the arms being provided with the end effector 20, the other arm can pour or extract the liquid, and thereby, a series of works can be efficiently performed by the single robot.

Moreover, other works include placing the container body 61, from which the lid 62 is detached, inside a case, etc. In this case, the end effector 20 provided to one of the robotic arms 10 moves the lid 62 toward the case while detaching the lid 62, and the other robotic arm 10 can open a door of the case at an appropriate timing. Therefore, the end effector 20 is capable of shortening time required for various works performed to the container 60 having the screw-type lid 62 to be opened and closed.

(Conclusion)

As described above, according to the end effector 20, the single end effector 20 can open and close the lid 62 while gripping the container body 61. Moreover, since the lid 62 can be opened and closed while the container 60 is moved, time required for various works can be shortened.

Moreover, since the gripping of the container body 61, and the gripping and the opening and closing of the lid 62, can be performed by the single end effector 20, expenses required for equipment which opens and closes the lid 62 of the container 60 can be reduced, and thus, a cost reduction is possible.

(Other Modifications)

Although the embodiment describes the case in which the lid 62 of the container 60 is opened on the table 4, and the case in which the lid 62 is opened while the container 60 is moved, the lid 62 may be closed while the container body 61, from which the lid 62 has been detached, is moved to the predetermined place. Also this configuration can shorten the work time.

Moreover, although in the embodiment the configuration of the end effector 20 provided to the robotic arm 10 is controlled by the controller 3 of the robot 1, the end effector 20 may be controlled by a configuration other than the controller 3 of the robot 1. For example, the end effector 20 may be provided with a configuration corresponding to the rotating part 30, and the rotating part may be rotated by a configuration other than the controller 3 of the robot 1 so as to rotate the lid gripper 25.

Moreover, in the embodiment, the container 60 is disposed upright on the first table 4 or the second table 5. However, even when the container 60 is disposed to be inclined, the work can be performed in the inclined state by the operation of the robotic arm 10 being controlled, and the disposed state of the container 60 is not limited to that described in the embodiment.

Moreover, the embodiment describes one example, and various configurations (e.g., the type and size of the container 60, the shape and size of the lid 62, and the type of the robot 1) can be changed without departing from the spirit of the present disclosure, and the present disclosure is not limited to the embodiment described above.

DESCRIPTION OF REFERENCE CHARACTERS

1 Robot (First Robot)
3 Controller
6 Second Robot
10 Robotic Arm
16 Wrist Part
20 End Effector
21 Container Gripper
22 Container Chuck
23 Container Gripper Body
25 Lid Gripper
26 Lid Gripper Body
27 Lid Chuck
30 Rotating Part
31 Guiding Part
32 Linear Guide (Guide)
33 First Limit Switch (Detector)
34 Second Limit Switch (Detector)
50 Liquid Supplying Part
60 Container
61 Container Body
62 Lid
63 Screw Portion
X Screw Axis

The invention claimed is:

1. An end effector, comprising:
a container gripper included in an arm which extends along a screw axis, the container gripper configured to grip a container body of a container and the container gripper does not rotate about the screw axis;
a lid gripper included in the arm, the lid gripper configured to grip a lid of the container and be movable on the screw axis of the lid while the container gripper grips the container body;
a rotating part included in the arm, the rotating part configured to rotate the lid gripper about the screw axis while the container gripper grips the container body;
a guiding part configured to guide the lid gripper, while being rotated by the rotating part, to move on the screw axis away from the container body to open the container or toward the container body to close the container; and
a detector configured to detect that the lid gripper is moved to one of an opened position and a closed position of the lid.

2. The end effector of claim 1, wherein the guiding part includes a guide configured to inhibit the lid gripper to rotate relative to the rotating part, and allow the lid gripper to move on the screw axis relative to the rotating part.

3. The end effector of claim 2, wherein
the container gripper includes a container chuck configured to grip the container body from sides, and
the lid gripper includes a lid chuck configured to grip the lid from above.

4. The end effector of claim 1, wherein
the container gripper includes a container chuck configured to grip the container body from sides, and
the lid gripper includes a lid chuck configured to grip the lid from above.

5. A robot, comprising:
the end effector of claim 1, wherein
the robot opens and closes the lid by the lid gripper of the end effector, while gripping and moving the container body by the container gripper of the end effector.

6. A robot, comprising:
the end effector of claim 1;
the arm; and
a controller configured to control operation of the arm, wherein
the arm includes:
a link; and
a wrist part rotatably provided to a tip of the link,
the container gripper is attached to the link,
the rotating part included in the wrist part, and
the controller stops the rotation of the rotating part when the detector detects that the lid gripper is moved to the opened position or the closed position of the lid.

7. The robot of claim 6, wherein the container gripper is servo-controlled by an external axis control of the controller.

8. The robot of claim 6, wherein
the arm has at least two robotic arms, and
the end effector is provided to at least one of the two robotic arms.

9. The robot of claim 8, wherein the robot is a dual-arm robot.

10. The robot of claim 6, wherein the robot opens and closes the lid by the lid gripper of the end effector, while gripping and moving the container body by the container gripper of the end effector.

11. A robot comprising the end effector of claim 1, wherein the robot is an articulated robot.

12. An end effector, comprising:
a container gripper included in an arm which extends along a screw axis, the container gripper configured to grip a container body of a container and the container gripper does not rotate about the screw axis;
a lid gripper included in the arm, the lid gripper configured to grip a lid of the container and be movable on the screw axis of the lid while the container gripper grips the container body; and
a rotating part included in the arm, the rotating part configured to rotate the lid gripper about the screw axis while the container gripper grips the container body.

13. The end effector of claim 12, wherein the rotating part moves the lid on the screw axis away from the container body to open the container or toward the container body to close the container.

14. The end effector of claim 12, further comprising:
a guide which inhibits the lid gripper to rotate relative to the rotating part, and allows the lid gripper to move on the screw axis relative to the rotating part.

15. The end effector of claim 12, wherein
the container gripper includes a container chuck configured to grip the container body from sides, and
the lid gripper includes a lid chuck configured to grip the lid from above.

16. A robot, comprising:
the end effector of claim 12, wherein
the robot opens and closes the lid by the lid gripper of the end effector, while gripping and moving the container body by the container gripper of the end effector.

17. A robot, comprising:
the end effector of claim 12;
the arm; and
a controller configured to control operation of the arm, wherein
the arm includes:
a link; and
a wrist part rotatably provided to a tip of the link,
the container gripper is attached to the link,
the rotating part included in the wrist part, and
the controller stops the rotation of the rotating part when the lid gripper is moved to the opened position or the closed position of the lid.

18. The robot of claim 17, wherein the container gripper is servo-controlled by an external axis control of the controller.

19. The robot of claim 17, wherein
the arm has at least two robotic arms, and
the end effector is provided to at least one of the two robotic arms.

20. A robot, comprising:
an arm extending along a screw axis, the arm including an end effector, the end effector including:
a container gripper to grip a container body of a container, wherein the container gripper does not rotate about eth screw axis;
a lid gripper to grip a lid of the container and be movable on the screw axis of the lid while the container gripper grips the container body;
a rotating part to rotate the lid gripper about the screw axis while the container gripper grips the container body; and
a guide which guides the lid gripper, while being rotated by the rotating part, to move on the screw axis away from the container body to open the container or toward the container body to close the container; and
a controller configured to control operation of the end effector.

* * * * *